United States Patent
Ali et al.

(10) Patent No.: US 12,495,403 B2
(45) Date of Patent: Dec. 9, 2025

(54) IRREGULAR RESOURCE ELEMENT MAPPING

(71) Applicant: Lenovo (Singapore) PTE. LTD., New Tech Park (SG)

(72) Inventors: Ali Ramadan Ali, Kraiburg am Inn (DE); Ankit Bhamri, Rödermark (DE); Alexander Johann Maria Golitschek Edler von Elbwart, Darmstadt (DE); Karthikeyan Ganesan, Kronberg im Taunus (DE); Vijay Nangia, Woodridge, IL (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 516 days.

(21) Appl. No.: 17/914,705

(22) PCT Filed: Mar. 25, 2021

(86) PCT No.: PCT/IB2021/052500
§ 371 (c)(1),
(2) Date: Sep. 26, 2022

(87) PCT Pub. No.: WO2021/191844
PCT Pub. Date: Sep. 30, 2021

(65) Prior Publication Data
US 2023/0104253 A1    Apr. 6, 2023

Related U.S. Application Data

(60) Provisional application No. 63/007,310, filed on Apr. 8, 2020, provisional application No. 62/994,637, filed on Mar. 25, 2020.

(51) Int. Cl.
H04W 72/04    (2023.01)
H04L 5/00    (2006.01)
(Continued)

(52) U.S. Cl.
CPC ....... *H04W 72/0453* (2013.01); *H04L 5/0092* (2013.01); *H04L 27/26025* (2021.01)

(58) Field of Classification Search
CPC ......... H04W 72/0453; H04L 27/26025; H04L 5/0092
See application file for complete search history.

(56) References Cited

U.S. PATENT DOCUMENTS

| | | |
|---|---|---|
| 2019/0090161 A1 | 3/2019 | Fan et al. |
| 2019/0150132 A1 | 5/2019 | Bala et al. |

(Continued)

FOREIGN PATENT DOCUMENTS

| | | |
|---|---|---|
| WO | 2016004634 A1 | 1/2016 |
| WO | 2017073084 A1 | 5/2017 |
| WO | 2018064403 A1 | 4/2018 |

OTHER PUBLICATIONS

Nokia, Nokia Shanghai Bell, "On uplink signal and channel structures for NR-U", 3GPP TSG RAN WG1 Meeting #95 R1-1812660, Nov. 12-16, 2018, pp. 1-18.
(Continued)

*Primary Examiner* — Sam Bhattacharya
(74) *Attorney, Agent, or Firm* — Kunzler Bean & Adamson

(57) ABSTRACT

Apparatuses, methods, and systems are disclosed for irregular resource element mapping. An apparatus (800) includes a transceiver (825) that is operable to communicate with a Radio Access Network ("RAN"). The apparatus (800) includes a processor (805) that receives (1005), via the transceiver (825), a resource element mapping configuration comprising an indication of an irregular subcarrier spacing for a plurality of subcarriers for the UE. The resource element mapping configuration may be defined by the RAN based on a carrier frequency. The processor (805) applies (1010) the indicated irregular subcarrier spacing to resource (Continued)

elements ("REs") of the UE according to the resource element mapping configuration for communicating with the RAN.

20 Claims, 8 Drawing Sheets

(51) Int. Cl.
  *H04L 27/26* (2006.01)
  *H04W 72/0453* (2023.01)

(56) References Cited

U.S. PATENT DOCUMENTS

| | | |
|---|---|---|
| 2019/0229867 A1 | 7/2019 | Yi et al. |
| 2019/0306860 A1 | 10/2019 | Ciochina |
| 2019/0357239 A1 | 11/2019 | Moon et al. |
| 2020/0015223 A1 | 1/2020 | Matsumura et al. |
| 2023/0109827 A1 | 4/2023 | Bhamri et al. |

OTHER PUBLICATIONS

Qualcomm, "New WID on Extending current NR operation to 71 GHz", 3GPP TSG RAN Meeting #86 RP-193229, Dec. 9-12, 2019, pp. 1-5.
Intel Corporation, "New SID: Study on supporting NR from 52.6GHz to 71 GHz", 3GPP TSG RAN Meeting #86 RP-193259, Dec. 9-12, 2019, p. 1-3.
PCT/IB2021/052500, "Notification of Transmittal of the International Search Report and the Written Opinion of the International Searching authority, or the Declaration", International Searching Authority, Jul. 14, 2021, pp. 1-11.
3GPP, "3rd Generation Partnership Project; Technical Specification Group Radio Access Network; NR; Physical channels and modulation (Release 16)", 3GPP TS 38.211 V16.0.0, Dec. 2019, pp. 1-129.
3GPP, 3rd Generation Partnership Project; Technical Specification Group Radio Access Network; NR; Physical layer procedures for data (Release 16), 3GPP TS 38.214 V16.0.0, Dec. 2019, p. 1-147.
3GPP, 3rd Generation Partnership Project; Technical Specification Group Radio Access Network; Evolved Universal Terrestrial Radio Access (E-UTRA); Physical layer procedures (Release 16), 3GPP TS 36.213 V16.1.0, Mar. 2020.
U.S. Appl. No. 17/914,730, "Office Action Summary", US Patent Office, filed Feb. 11, 2025, pp. 1-18.
U.S. Appl. No. 17/914,730, "Office Action Summary", United States Patent and Trademark Office, Jul. 14, 2025, pp. 1-18.

IRREGULAR RESOURCE ELEMENT MAPPING

FIELD

The subject matter disclosed herein relates generally to wireless communications and more particularly relates to irregular resource element mapping.

BACKGROUND

In certain wireless communication systems, communication is supported on high-frequency radio bands with spacing between subcarriers.

BRIEF SUMMARY

Disclosed are solutions for irregular resource element mapping, e.g., for dealing with phase noise at high frequency. The solutions may be implemented by apparatuses, systems, methods, or computer program products.

In some embodiments, the radio access network ("RAN") supports a new resource element mapping to the time/frequency grid for phase noise effect treatment at high frequencies by allowing the system to use low subcarrier spacing ("SCS") with a network-based configuration based on the carrier frequency, the allocated bandwidth ("BW"), and the quality of service ("QoS") requirements.

In certain embodiments, the resource element mapping includes mapping subcarriers close to a baseband direct current ("DC") with less density than subcarriers at the edges of the spectrum. In certain embodiments, the resource element mapping includes splitting the resource blocks ("RBs") to different sets with different subcarrier offsets. In certain embodiments, the resource element mapping includes muting set of RBs close to DC and keeping the default spacing for the rest of RBs. In certain embodiments, the resource element mapping includes puncturing data subcarriers for RBs close to the DC and keeping the default configuration of reference signals when the configured SCS $\mu$ is above a certain threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
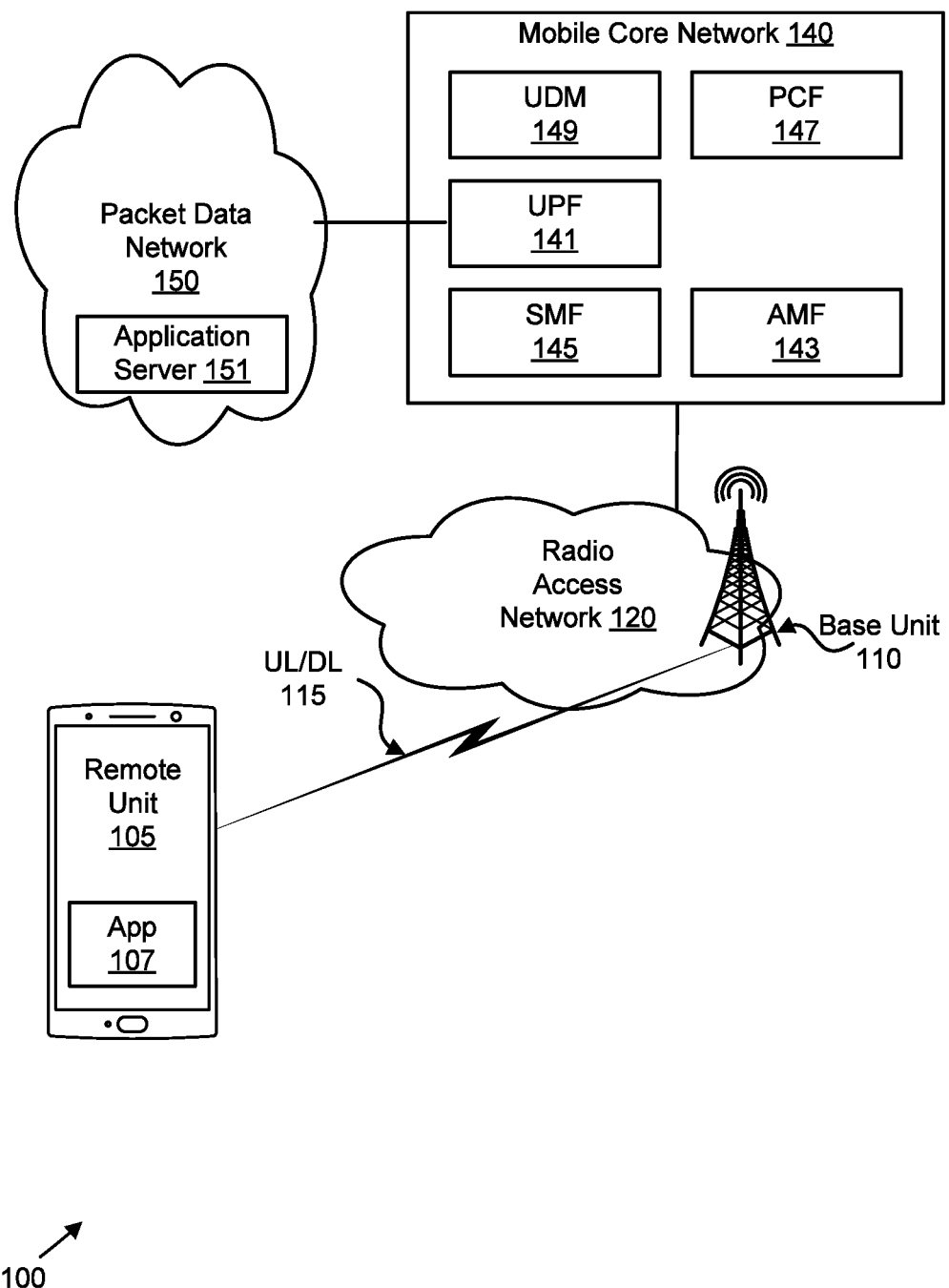
FIG. 1 is a schematic block diagram illustrating one embodiment of a wireless communication system for irregular resource element mapping.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for irregular resource element mapping. In various embodiments, NR existing DL and UL waveforms may be adapted to support operation between 52.6 GHz and 71 GHz. For example, applicable numerology (including subcarrier spacing), channel bandwidth (including maximum bandwidth) may be adapted for operation at the higher-frequency ranges. In various embodiments, physical layer aspects may be adapted including the use of new numerology or numerologies (µ value in 38.211) for operation in this frequency range.

In the following descriptions, the terms antenna, panel, antenna panel, device panel and UE panel are used interchangeably. An antenna panel may be a hardware that is used for transmitting and/or receiving radio signals at frequencies lower than 6 GHz, e.g., frequency range 1 (FR1), or higher than 6 GHz, e.g., frequency range 2 (FR2) or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency (RF) chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device antenna panel (e.g., of a UE or RAN node) may be a physical or logical antenna array comprising a set of antenna elements or antenna ports that share a common or a significant portion of an RF chain (e.g., in-phase/quadrature (I/Q) modulator, analog to digital (A/D) converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier (LNA) power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping.

A device may report its capability with respect to the "device panel" to the gNB or network. The device capability may include at least the number of "device panels." In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. For example, qcl-Type may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}.

Spatial Rx parameters may include one or more of: angle of arrival (AoA,) Dominant AoA, average AoA, angular spread, Power Angular Spectrum (PAS) of AoA, average AoD (angle of departure), PAS of AoD, transmit/receive channel correlation, transmit/receive beamforming, spatial channel correlation, etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

Disclosed herein are solutions for mitigating the impact of high subcarrier spacing ("SCS") on the system design. To deal with inter-carrier interference ("ICI") caused by phase noise at high frequencies, high subcarrier spacing is required. However, increasing the subcarrier spacing has an impact on the physical layer channel's structure and signaling For example, as the symbol length is reduced by a factor of two for doubling the SCS, an increase of cyclic prefix ("CP") overhead is required to cope with multipath effect in some scenarios. Also, the number of hybrid automatic repeat request ("HARQ") processes would increase due to the shortened transmission time interval ("TTI") length (e.g., scheduling unit).

Multiple orthogonal frequency-division multiplexing ("OFDM") numerologies are supported as given by Table 1 where μ and the cyclic prefix for a downlink or uplink bandwidth part are obtained from the higher-layer parameter subcarrierSpacing and cyclicPrefix, respectively.

TABLE 1

Supported transmission numerologies.

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Regarding the resource grid, for each numerology and carrier, a resource grid of $N_{grid,x}^{size,\mu} N_{sc}^{RB}$ subcarriers and $N_{symb}^{subframe,\mu}$ OFDM symbols is defined, starting at common resource block ("RB") $N_{grid}^{start,\mu}$ indicated by higher-layer signaling. There is one set of resource grids per transmission direction (uplink, downlink, or sidelink) with the subscript x set to DL, UL, and SL for downlink, uplink, and sidelink, respectively. When there is no risk for confusion, the subscript x may be dropped. There is one resource grid for a given antenna port p, subcarrier spacing configuration μ, and transmission direction (downlink, uplink, or sidelink).

For uplink and downlink, the carrier bandwidth $N_{grid}^{size,\mu}$ for subcarrier spacing configuration μ is given by the higher-layer parameter carrierBandwidth in the SCS-SpecificCarrier IE. The starting position $N_{grid}^{start,\mu}$ for subcarrier spacing configuration μ is given by the higher-layer parameter offsetToCarrier in the SCS-SpecificCarrier IE.

The frequency location of a subcarrier refers to the center frequency of that subcarrier.

For the downlink, the higher-layer parameter txDirectCurrentLocation in the SCS-SpecificCarrier IE indicates the location of the transmitter baseband direct current ("DC") subcarrier in the downlink for each of the numerologies configured in the downlink. Values in the range 0-3299 represent the number of the DC subcarrier and the value 3300 indicates that the DC subcarrier is located outside the resource grid.

For the uplink, the higher-layer parameter txDirectCurrentLocation in the UplinkTxDirectCurrentBWP IE indicates the location of the transmitter DC subcarrier in the uplink for each of the configured bandwidth parts, including whether the DC subcarrier location is offset by 7.5 kHz relative to the center of the indicated subcarrier or not. Values in the range 0-3299 represent the number of the DC subcarrier, the value 3300 indicates that the DC subcarrier is located outside the resource grid, and the value 3301 indicates that the position of the DC subcarrier in the uplink is undetermined.

Regarding resource elements, each element in the resource grid for antenna port p and subcarrier spacing configuration μ is called a resource element and is uniquely identified by $(k,l)_{p,\mu}$ where k is the index in the frequency domain and l refers to the symbol position in the time domain relative to some reference point. Resource element $(k,l)_{p,\mu}$ corresponds to a physical resource and the complex value $a_{k,l}^{(p,\mu)}$. When there is no risk for confusion, or no particular antenna port or subcarrier spacing is specified, the indices p and μ may be dropped, resulting in $a_{k,l}^{(p)}$ or $a_{k,l}$.

Regarding the mapping of physical resource blocks ("PRBs") to virtual resource blocks, the user equipment ("UE") assumes, for each of the antenna ports used for transmission of the physical channel, that the block of complex-valued symbols $y^{(p)}(0), \ldots, y^{(p)}(M_{symb}^{ap}-1)$ conform to the downlink power allocation and are mapped in sequence starting with $y^{(p)}(0)$ to resource elements $(k',l)_{p,\mu}$ in the virtual resource blocks assigned for transmission which meet all of the following criteria: 1) they are in the virtual resource blocks assigned for transmission; 2) the corresponding physical resource blocks are declared as available for physical downlink shared channel ("PDSCH"); and 3) the corresponding resource elements in the corresponding physical resource blocks are: a) not used for transmission of the associated demodulation reference signal ("DM-RS") or DM-RS intended for other co-scheduled UEs; b) not used for non-zero-power channel state information reference signal ("CSI-RS") if the corresponding physical resource blocks are for PDSCH scheduled by physical downlink control channel ("PDCCH") with cyclic redundancy check ("CRC") scrambled by cell radio network temporary identifier ("C-RNTI"), Modulation Coding Scheme C-RNTI ("MCS-C-RNTI"), configured scheduling RNTI ("CS-RNTI"), or PDSCH with semi-persistent scheduling ("SPS"), except if the non-zero-power CSI-RS is a CSI-RS configured by the higher-layer parameter CSI-RS-Resource-Mobility in the MeasObjectNR IE or except if the non-zero-power CSI-RS is an aperiodic non-zero-power CSI-RS resource; c) not used for phase tracking reference signal ("PT-RS"); and d) not declared as not available for PDSCH.

Conventionally, the mapping to resource elements $(k',l)_{p,\mu}$ allocated for PDSCH and not reserved for other purposes shall be in increasing order of first the index k' over the assigned virtual resource blocks, where k'=0 is the first subcarrier in the lowest-numbered virtual resource block assigned for transmission, and then the index l.

FIG. 1 depicts a wireless communication system 100 directional LBT, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140. As described above, the wireless communication links 115 may employ higher-frequency radio, e.g., in the 52.6 GHz to 71 GHz ranges.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

While FIG. 1 depicts components of a 5G RAN and a 5G core network, the described embodiments for irregular resource element mapping apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF mapped to a control plane portion of a PGW and/or to an MME, the UPF map to an SGW and a user plane portion of the PGW, the UDM/UDR maps to an HSS, etc.

In the following descriptions, the term "gNB" is used for the base station but it is replaceable by any other radio access node, e.g., RAN node, eNB, BS, eNB, gNB, AP, NR, etc. Further the operations are described mainly in the context of 5G NR. However, the proposed solutions/methods are also equally applicable to other mobile communication systems supporting radio communications at higher frequency ranges.

Figure 2A:
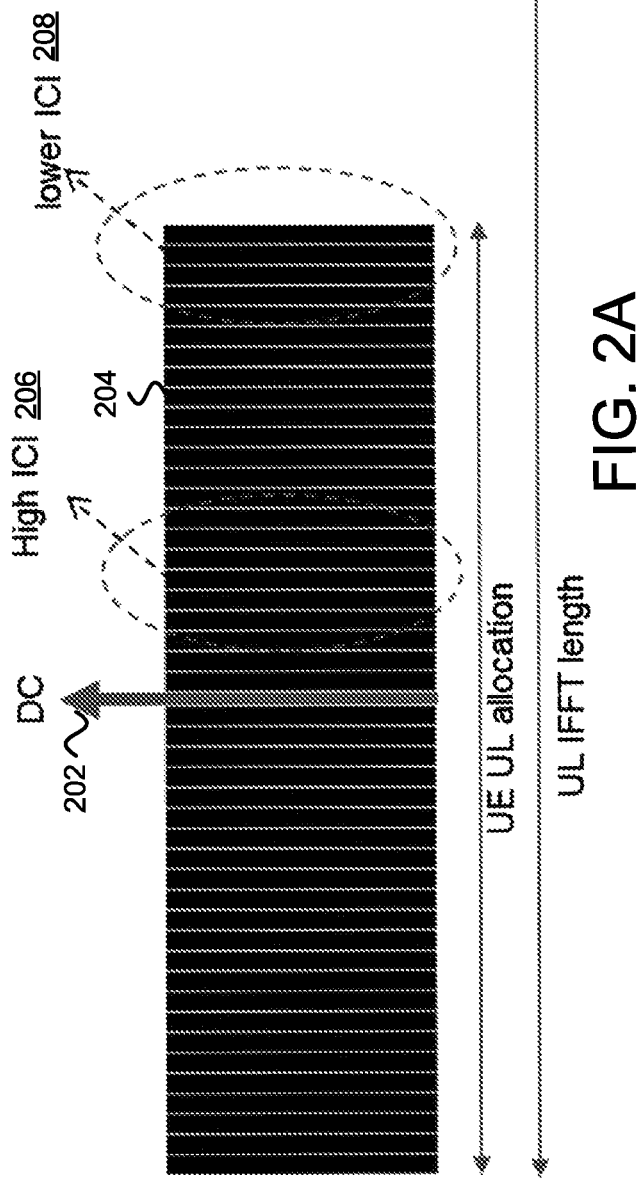
FIG. 2A is a diagram illustrating spacing and intercarrier interference between active subcarriers.
Figure 2B:
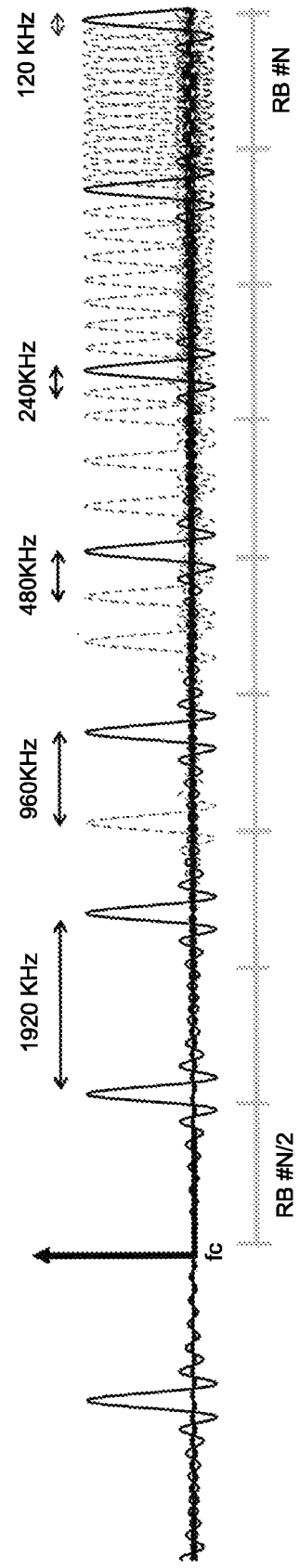
FIG. 2B is a diagram illustrating an embodiment of irregular spacing between active subcarriers.

As shown in FIG. 2A, the ICI effect decreases with increasing the frequency offset from the center frequency. For example, in case of UL, the ICI 208 observed on the subcarriers located close to the edge of the UL allocation of the UE is slightly less than the ICI 206 close to the baseband DC 202 due to the different number of surrounding subcarriers contributing to the ICI. This motivates adopting irregular or interleaved baseband subcarrier mapping with lower SCS, such that subcarriers close to the baseband DC 202 are mapped with a frequency offset, e.g., by leaving REs 204 that are empty or unoccupied to generate higher spacing between carriers than that produced by the default SCS. The spacing between the subcarriers is reduced e.g., as we go from baseband DC 202, as illustrated in FIG. 2B.

Phase noise is a multiplicative noise process with time-domain signal, and the ICI created on OFDM subcarriers with a sufficient number of neighbor subcarriers (dependent of subcarrier spacing) is expected to be similar. At or near the band/carrier edge or resource allocation edge (e.g., in uplink) due to fewer surrounding subcarriers, the ICI is expected to be lower. Thus, subcarriers closer to the center of the band/carrier/allocation may use a larger spacing between subcarriers compared to subcarriers near the band/carrier/allocation edge. In one embodiment, irregular subcarrier mapping can result in a lower overhead compared to interleaved/equally-spaced subcarrier mapping.

Figure 3:
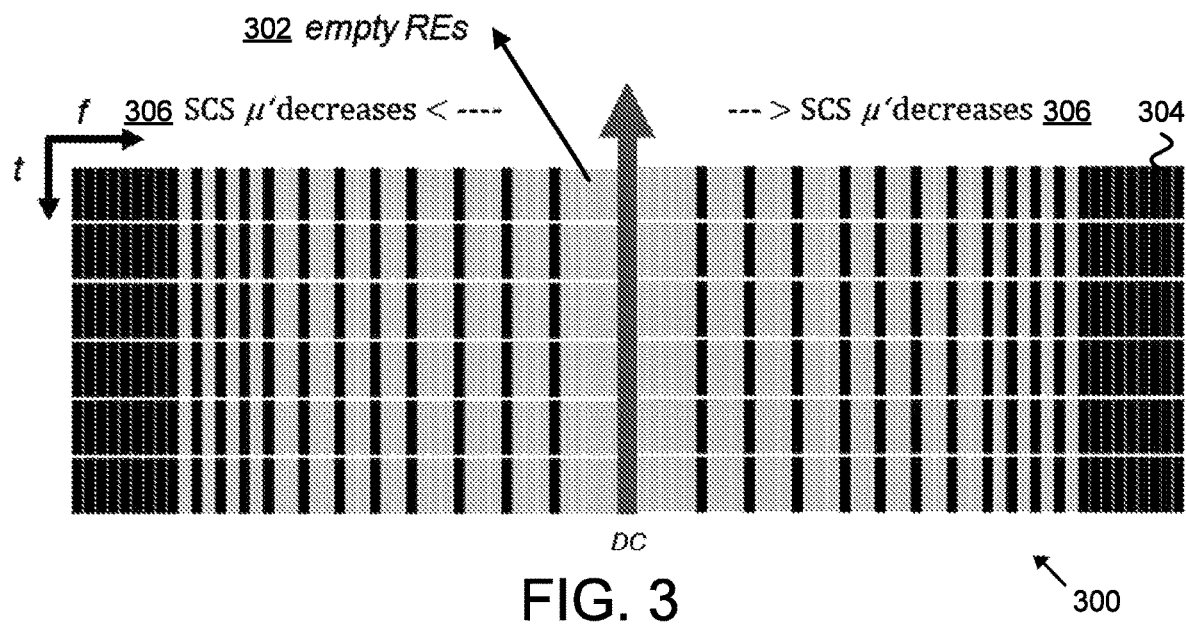
FIG. 3 is a diagram illustrating one embodiment of spacing between active subcarriers with frequency offset.

FIG. 3 depicts one embodiment of a resource grid 300 with spacing, e.g., empty/unoccupied REs 302, between non-empty/active/occupied REs 304 with subcarriers with frequency offset, illustrating one example of a first solution. According to the first solution, the mapping to resource elements $(k',l)_{p,\mu}$ (where k' is carrier index, l is the symbol index, p is the antenna port, and µ is the SCS index, with which the signal is generated) allocated for PDSCH/PUSCH and not reserved for other purposes is in increasing order of first the index k' over the assigned resource blocks. Element k' is allocated in the subcarrier k+k", where k" is the frequency offset between the subcarriers to generate an artificial SCS µ' 306 in the lowest-numbered resource block assigned for transmission, and then the index l. In certain embodiments, the frequency offset decreases k" with the RB index.

Figure 4:
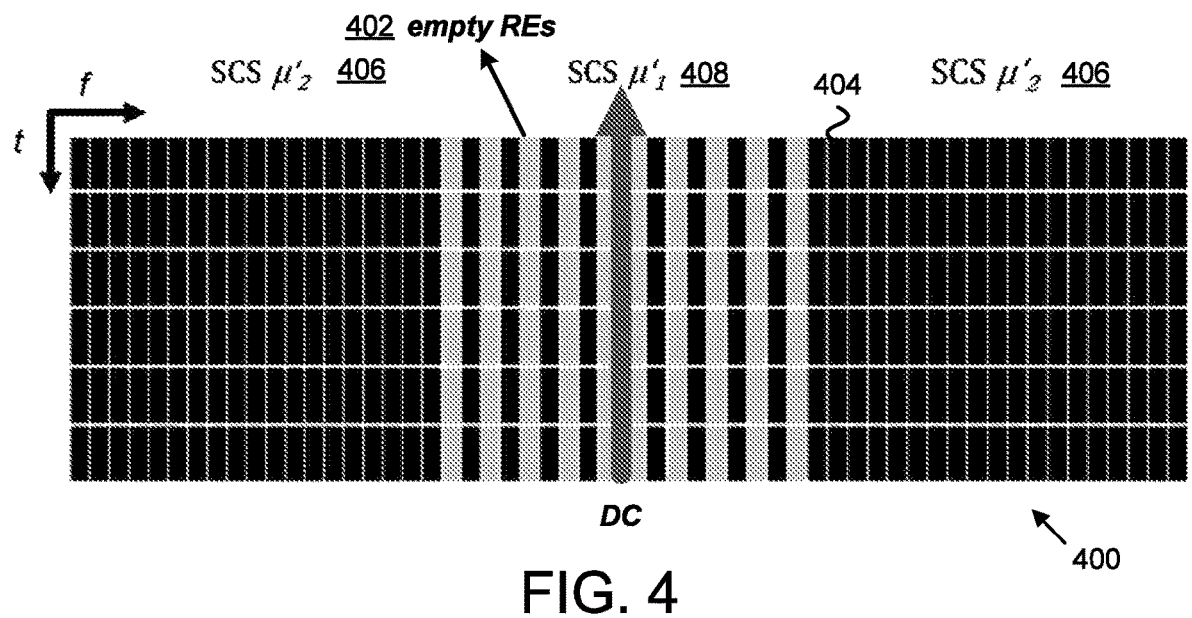
FIG. 4 is a diagram illustrating one embodiment of using two artificial subcarrier spacings.

FIG. 4 depicts one embodiment of a resource grid 400 with spacing, e.g., empty/unoccupied REs 402, between non-empty/active/occupied REs 404 with subcarriers with frequency offset, illustrating one example of a second solution. According to the second solution, gNB/UE are configured by high layers to perform RE/subcarrier mapping of DL/UL, such that subcarriers in the first set of RBs are allocated with frequency offset $k_1''$, where $k_1''$, is associated with artificial SCS $\mu_1''$ 408, and REs of other RBs are allocated with frequency offset $k_2''$, where $k_2''$ is associated with artificial SCS $\mu_2'$ 406, where RBs close to baseband DC are allocated based on the higher artificial SCS. The mapping to resource elements $(k',l)_{p,\mu}$ allocated for PDSCH and not reserved for other purposes is in increasing order of first the index k' over the assigned resource blocks, where element k' is allocated in the subcarriers $k+k_1''$ in the first set of RBs, and in the subcarriers $k+k_2''$ for the second set of RBs, where $k_1''$ and $k_2''$ are the frequency offset between the subcarriers associated with $\mu_1'$ and $\mu_2'$, respectively and $\mu_1'$ is higher than $\mu_2'$.

Figure 5:
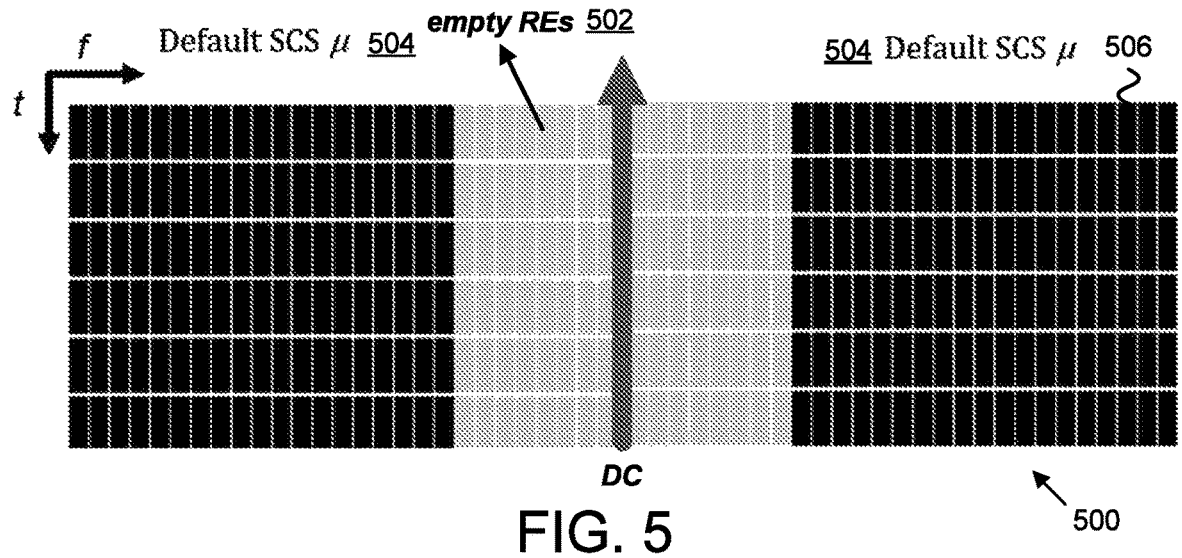
FIG. 5 is a diagram illustrating one embodiment of keeping empty resource blocks around DC.

FIG. 5 depicts one embodiment of a resource grid 500 with spacing, e.g., empty/unoccupied REs 502, between non-empty/active/occupied REs 506 with subcarriers with frequency offset, illustrating one example of a third solution. According to the third solution, gNB/UE are configured by high layers to perform RE/subcarrier mapping of DL/UL, such that the first set of the configured RBs close to baseband DC carry no active data subcarriers, e.g., empty REs 502, instead empty/zero power subcarriers are used. The REs of the second set of RBs are allocated based on the default configured SCS µ 504. The mapping to resource elements $(k',l)_{p,\mu}$ allocated for PDSCH/PUSCH and not reserved for other purposes is in increasing order of first the index k' over the assigned resource blocks, where k'=0 is the first subcarrier in the lowest-numbered resource block in the second set of RBs assigned for transmission, and then l.

Figure 6:
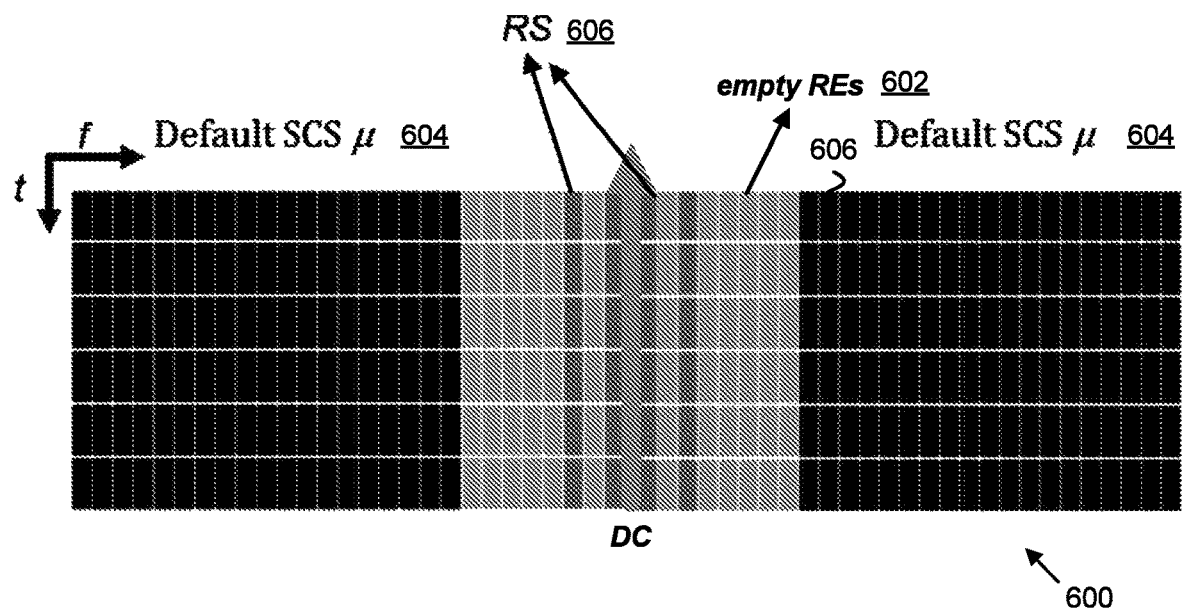
FIG. 6 is a diagram illustrating one embodiment of utilizing the empty resource blocks for reference signal transmission.

FIG. 6 depicts one embodiment of a resource grid 600 with spacing, e.g., empty/unoccupied REs 602, between non-empty/active/occupied REs 606 with subcarriers with frequency offset, illustrating one example of a fourth solution. According to the fourth solution, gNB/UE are configured by high layers to perform RE/subcarrier mapping of DL/UL, such that the first set of the configured RBs close to baseband DC carry no active data subcarriers, instead reference signals 606 are allocated on some subcarriers. The REs of the second set of RBs are allocated based on the default configured SCS µ 604. The mapping to resource elements $(k',l)_{p,\mu}$ allocated for PDSCH/PUSCH and not reserved for other purposes is in increasing order of first the index k' over the assigned resource blocks, where k'=0 is the first subcarrier in the lowest-numbered resource block in the second set of RBs assigned for transmission, and then the index l.

In one embodiment of the fourth solution, when the configured SCS μ is above a certain threshold, then only the RSs 606, such as demodulation reference signal ("DM-RS"), phase tracking reference signal ("PT-RS"), channel state information reference signal ("CSI-RS"), sounding reference signal ("SRS"), or the like are transmitted in first set of the configured RBs close to baseband DC, according to indicated configurations for the corresponding RSs 606 and the data subcarriers within the first set of configured RBs are punctured. In such a configuration, the transmission of RSs remains same, while the number of data subcarriers is reduced.

In another embodiment of the fourth solution, when the configured SCS μ is above a certain threshold, then no DM-RS is transmitted in the first set of the configured RBs close to baseband DC. DM-RS may only be transmitted in the RBs where data is also transmitted either partially or completely. Different modes of DM-RS transmission described in the fourth solution in the first set of configured RBs close to baseband DC can be configurable either with higher layer signaling such as radio resource control ("RRC") or dynamic signaling via downlink control information ("DCI") or configurable according to pre-defined rules/tables.

According to a fifth solution, the number of RBs where the default transmission of data subcarriers is impacted is configured as a function of SCS as shown in Table 2 below. In addition, the offset in terms of number of subcarriers between the data subcarriers in the corresponding RBs can also be configured as shown in Table 3. In another implementation, both the tables could be configured as a single configuration to the UE.

In another implementation, 'k'''' offset between data subcarriers and/or number of RBs with 'k'''C' offset is also specified as an information element ("IE") in RRC bandwidth part ("BWP") dedicated configuration and the PDSCH/PUSCH allocation in that BWP follows a specified offset.

TABLE 2

Number of RBs with fixed offset 'k''' as a function of SCS

| Subcarrier Spacing | Number of RBs with 'k''' offset between data subcarriers |
|---|---|
| 240 KHz | 8 |
| 480 KHz | 4 |
| 960 KHz | 2 |

TABLE 3

Number of RBs with variable offset 'k''' as a function of SCS

| Subcarrier Spacing | Number of RBs with 'k''' offset | 'k''' offset between data subcarriers |
|---|---|---|
| 240 KHz | [0-3, 4-7] | [6, 3] |
| 480 KHz | [0-1, 2-3] | [8, 4] |
| 960 KHz | [0, 1] | [12, 6] |

The above solutions have been described generally as it relates to which REs/RBs are transmitted by the gNB. There are two general flavors how to achieve this, which are particularly relevant for the handling of a transport block and the mapping on resource elements.

Flavor 1—Rate Matching

In this flavor, only the resources that are intended for transmission are considered for handling of the transport block. In particular, for purposes of rate matching, only the available REs are considered in order to determine the number of bits and symbols that can be conveyed in the assigned time/frequency ("T/F") resources. So, with respect to e.g., FIG. 5, only the non-empty (dark-colored) REs 506 are counted, while the empty REs (grey-colored) REs 502 are neglected. So, in FIG. 5, an overall 6×16 (empty)+6×38 (non-empty)=324 REs are assigned, and only the non-empty (dark) 6×38=228 REs are used, which results e.g., in 16-QAM in 912 bits that can be carried. In one embodiment, this flavor achieves the best performance because the rate matching, or its inversion, is using the information that corresponds to the utilization of the radio resource.

The information on which REs are used, or alternatively the REs that are not used, for the transmission of the transport block needs to be available at the UE, which is known herein as "assistance information." If the UE is the receiver, in one embodiment, the assistance information is required so that the rate matching process employed by the transmitted entity can be inverted correctly. If the UE is the transmitter, in one embodiment, the assistance information is required so that the rate matching process is done with the correct parameters. The assistance information may be conveyed as part of the resource assignment (e.g., in the PDCCH/DCI carrying the resource assignment), or it may be included in a groupcast/broadcast signal (e.g., carried by DCI format 2_0), by uplink control information ("UCI"), or by means of higher layer signaling such as RRC configuration or media access control ("MAC") element.

Flavor 2—RE Puncturing, RE Muting, and/or Zero-Power RE

In this flavor, in one embodiment, all the assigned resources are considered for handling of the transport block. In particular for purposes of rate matching, all assigned REs are considered to determine the number of bits and symbols that can be conveyed in the assigned T/F resources. So, with respect to e.g., FIG. 5, empty 502 and non-empty REs 506 (marked in dark and grey, respectively) are counted. So, in FIG. 5, an overall 6×16 (empty)+6×38 (non-empty)=324 REs are assigned, which results in e.g., for 16-QAM in 1296 bits that can be carried. However, in one embodiment, only the symbols carried by the non-empty (dark) REs are actually transmitted. This could be interpreted as puncturing empty (grey) REs, or muting empty (grey) REs, or transmitting empty (grey) REs with zero power. In one embodiment, flavor 2 achieves a suboptimum performance because the rate matching, or its inversion, is using the information that is inaccurately corresponding to the utilization of the radio resource.

Compared to the information already available as part of the resource assignment, no additional assistance information is necessary at the UE, which is known herein as "flavor 2a." In case of downlink transmissions, in one embodiment, the receiving UE will still process the empty (grey) REs as usual, which usually implies that only noise/interference is contained in the corresponding symbols, which will deteriorate the decoding performance slightly but is still technically possible (albeit at a higher error probability due to the noise/interference). Likewise, if the UE is the transmitter and mutes the REs, the same applies mutatis mutandis to the gNB receiver.

The performance may be improved in this flavor however if some assistance information is available about the muted or unmuted REs, known herein as "flavor 2b." In such an embodiment, the receiver can ignore the corresponding REs for processing, so that no additional noise/interference is picked up by the receiver. In this way, there would only be the suboptimum rate matching performance that deteriorates the decoding compared to the first flavor. The assistance information about the muted REs, or alternatively about the unmuted REs, for the transmission of the transport block may be conveyed as part of the resource assignment (e.g., in the PDCCH/DCI carrying the resource assignment), or it may be included in a groupcast/broadcast signal (e.g., carried by DCI format 2_0), by uplink control information (UCI), or by means of higher layer signaling such as RRC configuration or MAC control element.

In one embodiment, the benefit of flavor 2b over flavor 2a is an improved decoding performance that is achieved by not picking up noise/interference from muted REs, at the cost of the required assistance information.

In one embodiment, the benefit of flavor 2b over flavor 1 is more simplified processing, because the rate matching, and its inversion, can be done as if all assigned resources are available, while the muting/nulling of REs can be very simply realized in the processing chain by corresponding setting of input values in the IFFT stage, while the drawback, in some embodiments, is suboptimum performance of the rate matching, and its inversion.

In one embodiment, the benefit of flavor 2a over flavor 1 is more simplified processing, because the rate matching, and its inversion, can be done as if all assigned resources are available, while the muting/nulling of REs can be very simply realized in the processing chain by corresponding setting of input values in the IFFT stage. Additionally, in certain embodiments, flavor 2a does not require any assistance information, so no additional signaling overhead is incurred. The drawback, in some embodiments, is worse decoding performance due to the suboptimum rate matching, and its inversion, and the noise/interference being picked up from the muted REs.

In another implementation, one or more of the above flavors can also be configured as part of the IE in an RRC BWP dedicated configuration.

In some embodiments, the frequency separation/offset (e.g., in terms on number of subcarriers; at least one frequency separation/offset with irregular subcarrier mapping) between (candidate) occupied (e.g., data/control/reference signal REs) subcarriers is determined based on at least one of frequency range of operation, frequency band, subcarrier spacing, modulation order, regulatory requirements (e.g., on bandwidth occupancy requirements), transmit DC subcarrier location (for the DL carrier for each of the numerologies configured in the downlink, for each of the configured bandwidth parts in the uplink), whether the baseband DC subcarrier location is offset by e.g., 7.5 kHz relative to the center of the indicated transmit DC subcarrier location, and/or the like.

In one example embodiment, a first frequency separation value is used when the baseband DC subcarrier is offset (e.g., by 7.5 kHz) relative to the center of the transmit DC subcarrier, and a second frequency separation value is used when the baseband DC subcarrier is not offset relative to the center of the transmit DC subcarrier. In another example embodiment, the location of the occupied subcarriers is selected such that at least one of the empty or null subcarriers (e.g., subcarriers between the occupied subcarriers) coincide with the transmit DC subcarrier location when the location of the transmit DC subcarrier is within the resource grid or carrier. In other words, in one embodiment, no occupied subcarrier coincides with the transmit DC subcarrier location when the location of the transmit DC subcarrier is within the resource grid or carrier. In one embodiment, this is beneficial as it reduces the impact of local oscillator leakage or baseband DC offset effects due to direct conversion transceivers on subcarriers near the baseband DC subcarrier.

In one example embodiment, the occupied subcarriers positions are determined based on the transmit DC subcarrier location (e.g., relative to the transmit DC subcarrier location). In one example, two occupied subcarriers closest to the transmit DC subcarrier are selected such that they are approximately equally spaced from the transmit DC subcarrier location. For example, for an odd number of N null/empty subcarriers between two occupied subcarriers, floor (N/2) null/empty subcarriers are between each of the occupied subcarrier and the transmit DC subcarrier; and for even number of N null/empty subcarriers between two occupied subcarriers, N/2 null/empty subcarriers are between a first occupied subcarrier and the transmit DC subcarrier and N/2−1 null/empty subcarriers are between a second occupied subcarrier and the transmit DC subcarrier. In some examples, the occupied subcarriers positions are determined based on a common reference point A for resource block grids (e.g., relative to the common reference point A), and point 0 is the center of subcarrier 0 of common resource block 0 which coincides with 'point A'.

In some embodiments, the null/empty subcarriers can provide the functionality of phase noise tracking for a receiver. In another example, the PT-RS can occupy a subset of the empty/null subcarriers. In one example, with irregular subcarrier mapping, the phase noise (e.g., common phase error) can be estimated based on locations with the larger spacing between subcarriers (e.g., using at least one of the null/empty subcarriers or PT-RS between the subcarriers) and phase noise tracking/suppression can be applied to the occupied subcarriers especially where the spacing between subcarriers is reduced. In some examples with irregular subcarrier mapping, a first spacing between subcarriers is used in a first portion of the transmit signal bandwidth or resource block grid, and a second spacing between subcarriers is used in a second portion of the transmit signal bandwidth or resource block grid.

In one embodiment, the proposed solution helps to deal with the phase noise effect at high frequency by using low SCS, such that a compromise between the required system performance with the existence of phase noise, CP, and its overhead requirement for dealing with multipath, the HARQ timing, and number of HARQ processes gives the system more flexibility. Furthermore, more signal-to-noise ratio ("SNR") is gained by using lower SCS due to the longer OFDM symbols.

On the other hand, in one embodiment, using empty REs between active subcarriers with lower SCS may reduce the peak data rate of the system. Therefore, in some embodiments, the offset between the subcarriers may be applied only to a few RBs that are close to baseband DC, and hence the spectral efficiency of the system may be enhanced.

Table 3 below shows an example of the peak data rate for different combinations of artificial SCSs with interleaved subcarriers comparing with the default SCS. In this table, RS and other overheads are not considered.

TABLE 4

Peak data rate for different subcarrier spacing configurations

| Default SCS (KHz) | #RBs, 400 MHz BW w/o gardGard | TTI length (μs) | Peak_through-put (64QAM raw) with default SCS μ | Peak_through-put with 2 artificial SCSs ($\mu'_1, \mu'_2$)1/2 #RBs each | Peak_through-put with 3 artificial SCSs ($\mu'_1, \mu'_2, \mu'_3$) 1/3 #RBs each | Peak_through-put with 2 artificial SCSs ($\mu'_1, \mu'_2$) (3/4, 1/4) #RBs | Peak_through-put with 2 artificial SCSs ($\mu'_1, \mu'_2$) (5/6, 1/6) #RBs |
|---|---|---|---|---|---|---|---|
| 240 | ~136 | 62.5 | ~2.2 Gbps | ~1.67 Gbps (240/480) | ~1.30 Gbps (240/480/960) | ~1.95 Gbps (240/480) | ~2.06 Gbps (240/480) |
| 480 | ~68 | 31.25 | ~2.2 Gbps | ~1.67 Gbps (480/960) | ~1.30 Gbps (480/960/1920) | ~1.95 Gbps (480/960) | ~2.06 Gbps (480/960) |

Figure 7:
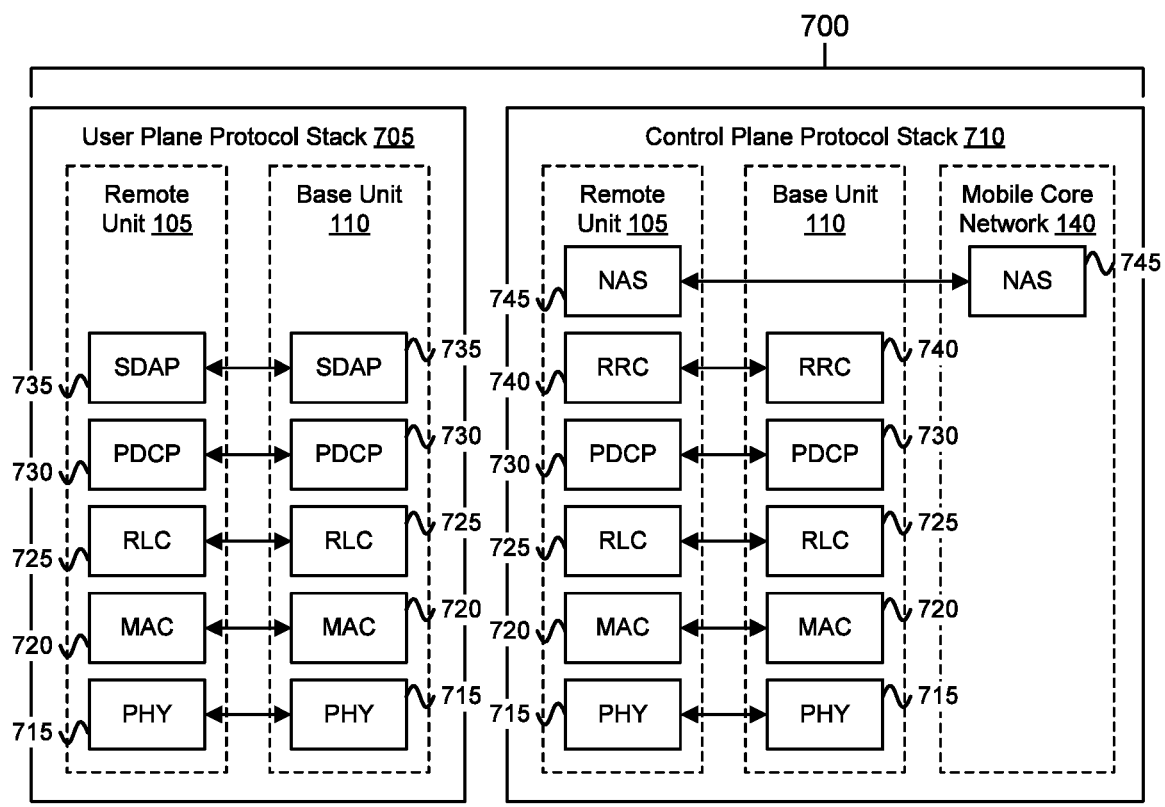
FIG. 7 depicts a new radio protocol stack.

FIG. 7 depicts a NR protocol stack 700, according to embodiments of the disclosure. While FIG. 7 shows the remote unit 105, the base unit 121 and the mobile core network 130, these are representative of a set of UEs interacting with a RAN node and a NF (e.g., AMF) in a core network. As depicted, the protocol stack 700 comprises a User Plane protocol stack 705 and a Control Plane protocol stack 710. The User Plane protocol stack 705 includes a physical ("PHY") layer 715, a Medium Access Control ("MAC") sublayer 720, a Radio Link Control ("RLC") sublayer 725, a Packet Data Convergence Protocol ("PDCP") sublayer 730, and Service Data Adaptation Protocol ("SDAP") layer 735. The Control Plane protocol stack 710 also includes a physical layer 715, a MAC sublayer 720, a RLC sublayer 725, and a PDCP sublayer 730. The Control Place protocol stack 710 also includes a Radio Resource Control ("RRC") 740 layer and a Non-Access Stratum ("NAS") layer 745.

The AS protocol stack for the Control Plane protocol stack 710 consists of at least RRC, PDCP, RLC and MAC sublayers, and the physical layer. The AS protocol stack for the User Plane protocol stack 705 consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer 740 and the NAS layer 745 for the control plane and includes, e.g., an Internet Protocol ("IP") layer or PDU Layer (note depicted) for the user plane. L1 and L2 are referred to as "lower layers" such as PUCCH/PUSCH or MAC CE, while L3 and above (e.g., transport layer, application layer) are referred to as "higher layers" or "upper layers" such as RRC.

The physical layer 715 offers transport channels to the MAC sublayer 720. The MAC sublayer 720 offers logical channels to the RLC sublayer 725. The RLC sublayer 725 offers RLC channels to the PDCP sublayer 730. The PDCP sublayer 730 offers radio bearers to the SDAP sublayer 735 and/or RRC layer 740. The SDAP sublayer 735 offers QoS flows to the mobile core network 130 (e.g., 5GC). The RRC layer 740 provides for the addition, modification, and release of Carrier Aggregation and/or Dual Connectivity. The RRC layer 740 also manages the establishment, configuration, maintenance, and release of Signaling Radio Bearers ("SRBs") and Data Radio Bearers ("DRBs"). In certain embodiments, a RRC entity functions for detection of and recovery from radio link failure.

Figure 8:
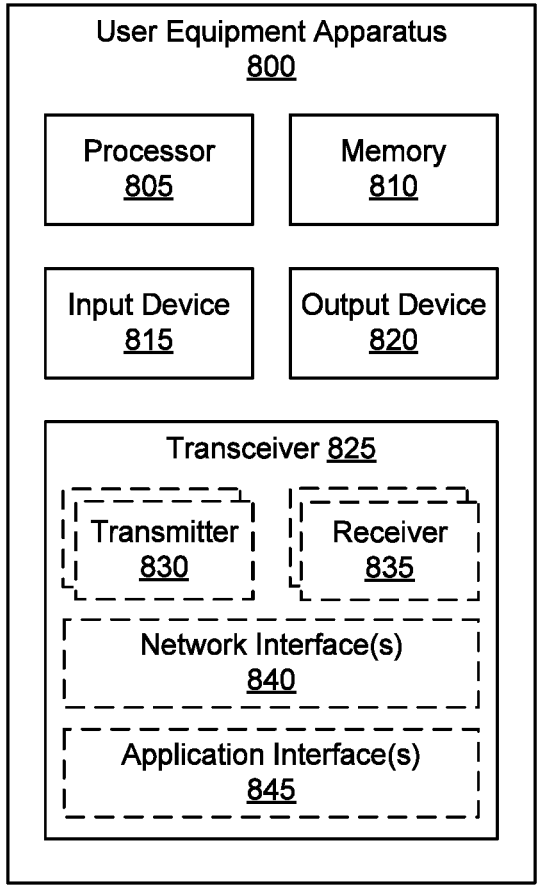
FIG. 8 is a block diagram illustrating one embodiment of a user equipment apparatus that may be used for irregular resource element mapping.

FIG. 8 depicts a user equipment apparatus 800 that may be used for irregular resource element mapping, according to embodiments of the disclosure. In various embodiments, the user equipment apparatus 800 is used to implement one or more of the solutions described above. The user equipment apparatus 800 may be one embodiment of a UE, such as the remote unit 105 and/or the UE 205, as described above. Furthermore, the user equipment apparatus 800 may include a processor 805, a memory 810, an input device 815, an output device 820, and a transceiver 825. In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more base units 121. Additionally, the transceiver 825 may support at least one network interface 840 and/or application interface 845. The application interface(s) 845 may support one or more APIs. The network interface(s) 840 may support 3GPP reference points, such as Uu and PC5. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and operating system ("OS") functions and a baseband processor (also known as "baseband radio processor") which manages radio functions.

In various embodiments, the processor 805 controls the user equipment apparatus 800 to implement the above described UE behaviors for irregular resource element mapping. In one embodiment, the transceiver 825 is operable to communicate with a Radio Access Network ("RAN"). In further embodiments, the processor 805 receives, via the transceiver 825, a resource element mapping configuration comprising an indication of an irregular subcarrier spacing for a plurality of subcarriers for the UE, the resource element mapping configuration defined by the RAN based on a carrier frequency. In one embodiment, the processor 805 applies the indicated irregular subcarrier spacing to resource elements ("REs") of the UE according to the resource element mapping configuration for communicating with the RAN.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to CSI enhancements for higher frequencies. For example, the memory 810 may store parameters, configurations, resource assignments, policies, and the like as described above. In certain embodiments, the memory 810 also stores program code and related data, such as an operating system or other controller algorithms operating on the user equipment apparatus 800, and one or more software applications.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all, or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. The transceiver 825 may be used to provide UL communication signals to a base unit 121 and to receive DL communication signals from the base unit 121, as described herein. Similarly, the transceiver 825 may be used to transmit and receive SL signals (e.g., V2X communication), as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an ASIC, or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
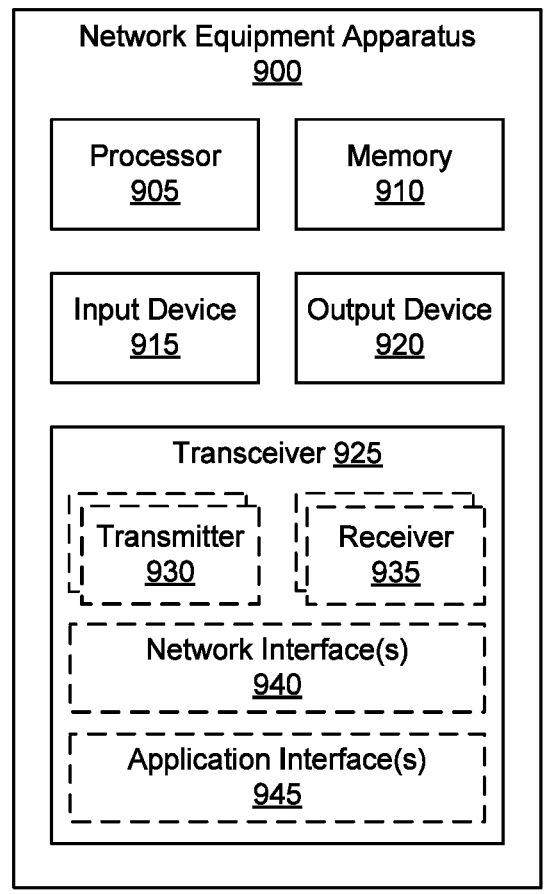
FIG. 9 is a block diagram illustrating one embodiment of a network equipment apparatus that may be used for irregular resource element mapping.

FIG. 9 depicts one embodiment of a network apparatus 900 that may be used for irregular resource element mapping, according to embodiments of the disclosure. In some embodiments, the network apparatus 900 may be one embodiment of a RAN node and its supporting hardware, such as the base unit 121 and/or gNB, described above. Furthermore, network apparatus 900 may include a processor 905, a memory 910, an input device 915, an output device 920, and a transceiver 925. In certain embodiments, the network apparatus 900 does not include any input device 915 and/or output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2, N3, N5, N6 and/or N7 interfaces. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. In certain embodiments, the processor 905 may include an application processor (also known as "main processor") which manages application-domain and operating system ("OS") functions and a baseband processor (also known as "baseband radio processor") which manages radio function.

In various embodiments, the processor 905 controls the network apparatus 900 to implement the above described network entity behaviors (e.g., of the gNB) for irregular resource element mapping. In one embodiment, the transceiver 925 is operable to communicate with a user equipment device ("UE"). In further embodiments, the processor 905 generates a resource element mapping configuration comprising an indication of an irregular subcarrier spacing for a plurality of subcarriers for a UE device based on a carrier frequency. In one embodiment, the processor 905 sends, via the transceiver 925, the resource element mapping configuration to the UE device.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data relating to CSI enhancements for higher frequencies. For example, the memory 910 may store parameters, configurations, resource assignments, policies, and the like as described above. In certain embodiments, the memory 910 also stores program code and related data, such as an operating system ("OS") or other controller algorithms operating on the network apparatus 900, and one or more software applications.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, may include any known electronically controllable display or display device. The output device 920 may be designed to output visual, audible, and/or haptic signals. In some embodiments, the output device 920 includes an electronic display capable of outputting visual data to a user. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all, or portions of the output device 920 may be integrated with the input device 915. For example, the input device 915 and output device 920 may form a touchscreen or similar touch-sensitive display. In other embodiments, all, or portions of the output device 920 may be located near the input device 915.

As discussed above, the transceiver 925 may communicate with one or more remote units and/or with one or more interworking functions that provide access to one or more PLMNs. The transceiver 925 may also communicate with one or more network functions (e.g., in the mobile core network 80). The transceiver 925 operates under the control of the processor 905 to transmit messages, data, and other signals and also to receive messages, data, and other signals. For example, the processor 905 may selectively activate the transceiver (or portions thereof) at particular times in order to send and receive messages.

The transceiver 925 may include one or more transmitters 930 and one or more receivers 935. In certain embodiments, the one or more transmitters 930 and/or the one or more receivers 935 may share transceiver hardware and/or circuitry. For example, the one or more transmitters 930 and/or the one or more receivers 935 may share antenna(s), antenna tuner(s), amplifier(s), filter(s), oscillator(s), mixer(s), modulator/demodulator(s), power supply, and the like. In one embodiment, the transceiver 925 implements multiple logical transceivers using different communication protocols or protocol stacks, while using common physical hardware.

Figure 10:
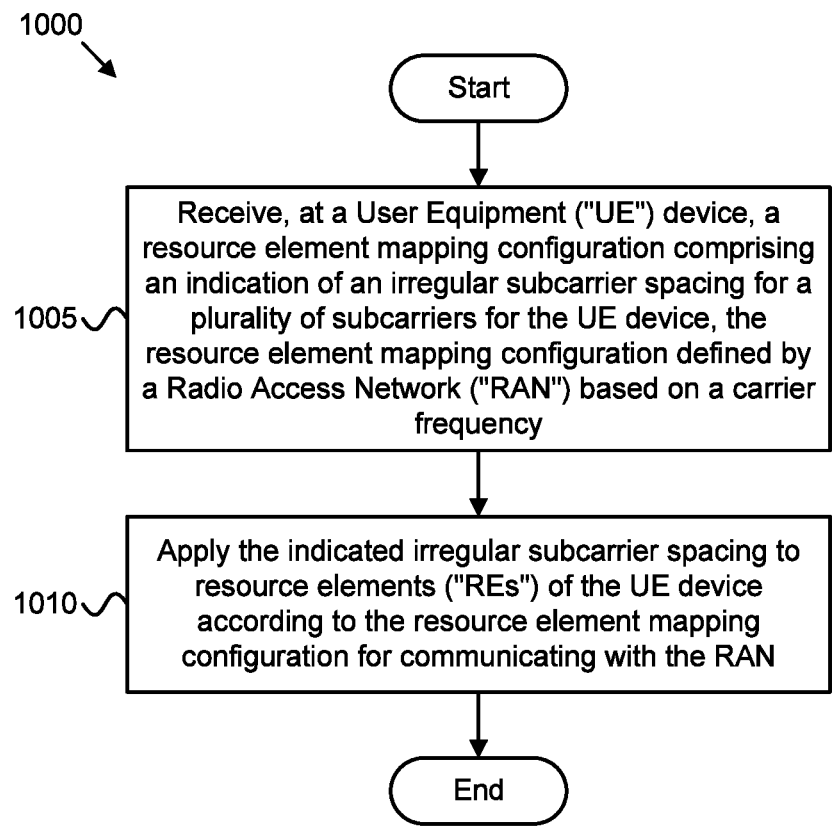
FIG. 10 is a flowchart diagram illustrating one embodiment of a method for irregular resource element mapping.

FIG. 10 is a flowchart diagram of a method 1000 for irregular resource element mapping. The method 1000 may be performed by a user equipment, such as the remote unit 105 and/or the user equipment apparatus 800. In some embodiments, the method 1000 may be performed by a processor executing program code, for example, a microcontroller, a microprocessor, a CPU, a GPU, an auxiliary processing unit, a FPGA, or the like.

In one embodiment, the method 900 receives 1005, at a UE device, a resource element mapping configuration comprising an indication of an irregular subcarrier spacing for a plurality of subcarriers for the UE device. The resource element mapping configuration may be defined by a Radio Access Network ("RAN") based on a carrier frequency. In further embodiments, the method 1000 applies 1010 the indicated irregular subcarrier spacing to resource elements ("REs") of the UE device according to the resource element mapping configuration for communicating with the RAN, and the method 1000 ends.

Figure 11:
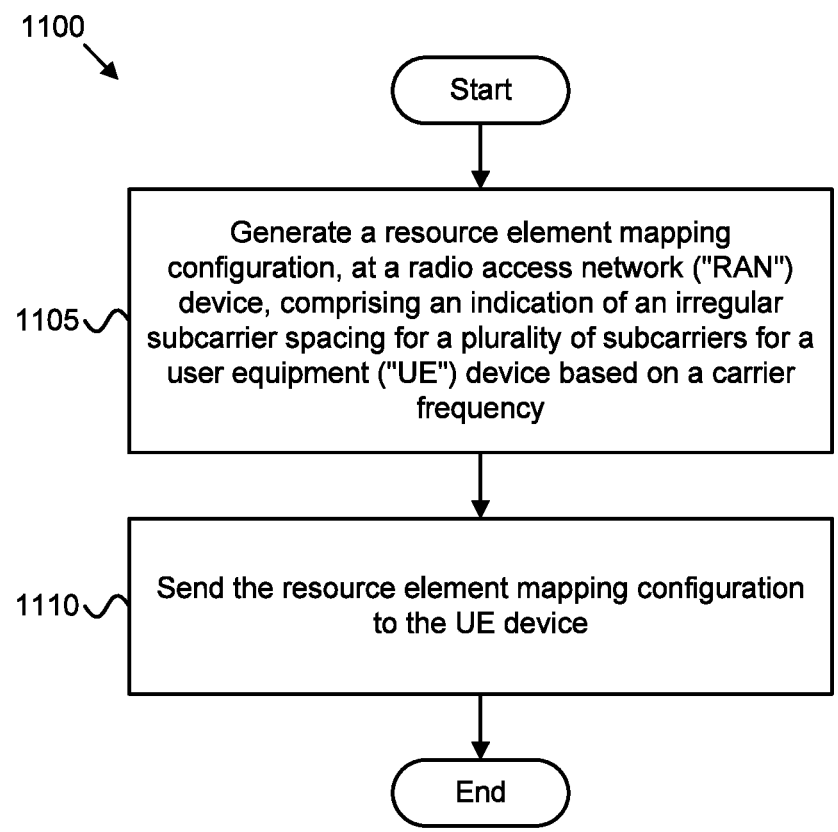
FIG. 11 is a flowchart diagram illustrating one embodiment of another method for irregular resource element mapping.

FIG. 11 is a flowchart diagram of a method 1100 for irregular resource element mapping. The method 1100 may be performed by a RAN node, such as the base unit 110 and/or the network equipment apparatus 1100. In some embodiments, the method 1100 may be performed by a processor executing program code, for example, a microcontroller, a microprocessor, a CPU, a GPU, an auxiliary processing unit, a FPGA, or the like.

In one embodiment, the method 1100 generates 1105 a resource element mapping configuration, at a radio access network ("RAN") device, comprising an indication of an irregular subcarrier spacing for a plurality of subcarriers for a user equipment ("UE") device based on a carrier frequency. The method 1100 sends 1110 the resource element mapping configuration to the UE device, and the method 1100 ends.

Disclosed herein is a first apparatus for irregular resource element mapping, according to embodiments of the disclosure. The first apparatus may be implemented by a user equipment, such as the remote unit 105 and/or the user equipment apparatus 800. The first apparatus includes a transceiver that, in one embodiment, is operable to communicate with a Radio Access Network ("RAN"). The first apparatus, in further embodiments, includes a processor that receives, via the transceiver, a resource element mapping configuration comprising an indication of an irregular subcarrier spacing for a plurality of subcarriers for the UE, the resource element mapping configuration defined by the RAN based on a carrier frequency. In one embodiment, the processor applies the indicated irregular subcarrier spacing to resource elements ("REs") of the UE according to the resource element mapping configuration for communicating with the RAN.

In one embodiment, the indication of the irregular subcarrier spacing comprises a parameter that indicates a frequency offset between the plurality of subcarriers. In some embodiments, the offset between two subcarriers of the plurality of subcarriers that are closer to a baseband direct current ("DC") is a higher frequency offset than the frequency offset between two different subcarriers that are further away from the baseband DC. In various embodiments, the frequency offset is determined based on at least one of a frequency range, a bandwidth, a default subcarrier spacing, a modulation and coding scheme, regulatory requirements, and whether the baseband DC subcarrier location is offset by 7.5 kHz relative to a center of the indicated subcarrier or not. In one embodiment, each RE is centered on a subcarrier and the plurality of REs are centered in the frequency domain about a default subcarrier spacing, the irregular subcarrier spacing comprising a frequency offset achieves a subcarrier spacing between REs that is offset from the default subcarrier spacing.

In some embodiments, resource blocks ("RB") of the UE device are split, according to the resource element mapping configuration, into different sets with different subcarrier offsets. In various embodiments, the indication of the irregular subcarrier spacing comprises a parameter that indicates a frequency offset between the subcarriers of each set of RBs of the UE device such that, for each set of RBs, the offset between two subcarriers that are closer to a baseband direct current ("DC") is a higher frequency offset than the frequency offset between two different subcarriers that are further away from the baseband DC.

In some embodiments, sets of RBs that are within a threshold frequency of the DC are muted while different sets of RBs that are without the threshold frequency use a default subcarrier spacing, the muted sets of RBs not carrying any data. In one embodiment, the muted sets of RBs are configured to send phase tracking reference signals ("PTRS"), the PTRS used for common phase error ("CPE")/inter-carrier interference ("ICI") estimation and for cancelling the CPE/ICI on data subcarriers that are transmitted with the default SCS.

In one embodiment, the resource element mapping configuration for subcarriers of muted REs of the sets of RBs comprises at least one muted RE that coincides with a transmit DC subcarrier location when the location of the transmit DC subcarrier is within a resource grid for the UE device. In further embodiments, the processor receives, via the transceiver, assistance information, the assistance information comprising information about a location of punctured bits that correspond to muted REs of the sets of RBs such that the punctured bits of the muted REs are ignored during decoding.

In one embodiment, the processor receives, via the transceiver, rate-matching parameters that consider the irregular mapping of the REs, the parameters comprising an indication of a number and a location of empty subcarriers for a rate-matching calculation. In certain embodiments, in response to not receiving rate-matching parameters and in response to no empty REs being used, the UE device performs normal reception and decoding of a transport block ("TB").

Disclosed herein is a first method for irregular resource element mapping, according to embodiments of the disclosure. The first method may be performed by a user equipment, such as the remote unit 105 and/or the user equipment apparatus 800. The first method includes receiving, at a User Equipment ("UE") device, a resource element mapping configuration comprising an indication of an irregular subcarrier spacing for a plurality of subcarriers for the UE device, the resource element mapping configuration defined by a Radio Access Network ("RAN") based on a carrier frequency. In further embodiments, the first method includes applying the indicated irregular subcarrier spacing to resource elements ("REs") of the UE device according to the resource element mapping configuration for communicating with the RAN.

In one embodiment, the indication of the irregular subcarrier spacing comprises a parameter that indicates a frequency offset between the plurality of subcarriers. In some embodiments, the offset between two subcarriers of the plurality of subcarriers that are closer to a baseband direct current ("DC") is a higher frequency offset than the frequency offset between two different subcarriers that are further away from the baseband DC. In various embodiments, the frequency offset is determined based on at least one of a frequency range, a bandwidth, a default subcarrier spacing, a modulation and coding scheme, regulatory requirements, and whether the baseband DC subcarrier location is offset by 7.5 kHz relative to a center of the indicated subcarrier or not. In one embodiment, each RE is centered on a subcarrier and the plurality of REs are centered in the frequency domain about a default subcarrier spacing, the irregular subcarrier spacing comprising a frequency offset achieves a subcarrier spacing between REs that is offset from the default subcarrier spacing.

In some embodiments, resource blocks ("RB") of the UE device are split, according to the resource element mapping configuration, into different sets with different subcarrier offsets. In various embodiments, the indication of the irregular subcarrier spacing comprises a parameter that indicates a frequency offset between the subcarriers of each set of RBs of the UE device such that, for each set of RBs, the offset between two subcarriers that are closer to a baseband direct current ("DC") is a higher frequency offset than the frequency offset between two different subcarriers that are further away from the baseband DC.

In some embodiments, sets of RBs that are within a threshold frequency of the DC are muted while different sets of RBs that are without the threshold frequency use a default subcarrier spacing, the muted sets of RBs not carrying any data. In one embodiment, the muted sets of RBs are configured to send phase tracking reference signals ("PTRS"), the PTRS used for common phase error ("CPE")/inter-carrier interference ("ICI") estimation and for cancelling the CPE/ICI on data subcarriers that are transmitted with the default SCS.

In one embodiment, the resource element mapping configuration for subcarriers of muted REs of the sets of RBs comprises at least one muted RE that coincides with a transmit DC subcarrier location when the location of the transmit DC subcarrier is within a resource grid for the UE device. In further embodiments, the first method includes receiving assistance information at the UE device, the assistance information comprising information about a location of punctured bits that correspond to muted REs of the sets of RBs such that the punctured bits of the muted REs are ignored during decoding.

In one embodiment, the first method includes receiving, at the UE device, rate-matching parameters that consider the irregular mapping of the REs, the parameters comprising an indication of a number and a location of empty subcarriers for a rate-matching calculation. In certain embodiments, in response to not receiving rate-matching parameters and in response to no empty REs being used, the UE device performs normal reception and decoding of a transport block ("TB").

Disclosed herein is a second apparatus for irregular resource element mapping, according to embodiments of the disclosure. The second apparatus may be implemented by a RAN node, such as the base unit 110 and/or the network equipment apparatus 900. The second apparatus includes a transceiver that, in one embodiment, is operable to communicate with a user equipment device ("UE"). The second apparatus, in further embodiments, includes a processor that generates a resource element mapping configuration comprising an indication of an irregular subcarrier spacing for a plurality of subcarriers for a UE device based on a carrier frequency. In one embodiment, the processor sends, via the transceiver, the resource element mapping configuration to the UE device.

In one embodiment, the indication of the irregular subcarrier spacing comprises a parameter that indicates a frequency offset between the plurality of subcarriers. In some embodiments, the offset between two subcarriers of the plurality of subcarriers that are closer to a baseband direct current ("DC") is a higher frequency offset than the frequency offset between two different subcarriers that are further away from the baseband DC. In various embodiments, the frequency offset is determined based on at least one of a frequency range, a bandwidth, a default subcarrier spacing, a modulation and coding scheme, regulatory requirements, and whether the baseband DC subcarrier location is offset by 7.5 kHz relative to a center of the indicated subcarrier or not. In one embodiment, each RE is centered on a subcarrier and the plurality of REs are centered in the frequency domain about a default subcarrier spacing, the irregular subcarrier spacing comprising a frequency offset achieves a subcarrier spacing between REs that is offset from the default subcarrier spacing.

In some embodiments, resource blocks ("RB") of the UE device are split, according to the resource element mapping configuration, into different sets with different subcarrier offsets. In various embodiments, the indication of the irregular subcarrier spacing comprises a parameter that indicates a frequency offset between the subcarriers of each set of RBs of the UE device such that, for each set of RBs, the offset between two subcarriers that are closer to a baseband direct current ("DC") is a higher frequency offset than the frequency offset between two different subcarriers that are further away from the baseband DC.

In some embodiments, sets of RBs that are within a threshold frequency of the DC are muted while different sets of RBs that are without the threshold frequency use a default subcarrier spacing, the muted sets of RBs not carrying any data. In one embodiment, the muted sets of RBs are configured to send phase tracking reference signals ("PTRS"), the PTRS used for common phase error ("CPE")/inter-carrier interference ("ICI") estimation and for cancelling the CPE/ICI on data subcarriers that are transmitted with the default SCS.

In one embodiment, the resource element mapping configuration for subcarriers of muted REs of the sets of RBs comprises at least one muted RE that coincides with a transmit DC subcarrier location when the location of the transmit DC subcarrier is within a resource grid for the UE device. In further embodiments, the processor sends, via the transceiver, assistance information to the UE device, the assistance information comprising information about a location of punctured bits that correspond to muted REs of the sets of RBs such that the punctured bits of the muted REs are ignored during decoding.

In one embodiment, the processor sends, to the UE device via the transceiver, rate-matching parameters that consider the irregular mapping of the REs, the parameters comprising an indication of a number and a location of empty subcarriers for a rate-matching calculation.

Disclosed herein is a second method for irregular resource element mapping, according to embodiments of the disclosure. The second method may be performed by a network equipment apparatus 900. The second method includes generating a resource element mapping configuration, at a radio access network ("RAN") device, comprising an indication of an irregular subcarrier spacing for a plurality of subcarriers for a user equipment ("UE") device based on a carrier frequency. In further embodiments, the second method includes sending the resource element mapping configuration to the UE device.

In one embodiment, the indication of the irregular subcarrier spacing comprises a parameter that indicates a frequency offset between the plurality of subcarriers. In some embodiments, the offset between two subcarriers of the plurality of subcarriers that are closer to a baseband direct current ("DC") is a higher frequency offset than the frequency offset between two different subcarriers that are further away from the baseband DC. In various embodiments, the frequency offset is determined based on at least one of a frequency range, a bandwidth, a default subcarrier spacing, a modulation and coding scheme, regulatory requirements, and whether the baseband DC subcarrier location is offset by 7.5 kHz relative to a center of the indicated subcarrier or not. In one embodiment, each RE is centered on a subcarrier and the plurality of REs are centered in the frequency domain about a default subcarrier spacing, the irregular subcarrier spacing comprising a frequency offset achieves a subcarrier spacing between REs that is offset from the default subcarrier spacing.

In some embodiments, resource blocks ("RB") of the UE device are split, according to the resource element mapping configuration, into different sets with different subcarrier offsets. In various embodiments, the indication of the irregular subcarrier spacing comprises a parameter that indicates a frequency offset between the subcarriers of each set of RBs of the UE device such that, for each set of RBs, the offset between two subcarriers that are closer to a baseband direct current ("DC") is a higher frequency offset than the frequency offset between two different subcarriers that are further away from the baseband DC.

In some embodiments, sets of RBs that are within a threshold frequency of the DC are muted while different sets of RBs that are without the threshold frequency use a default subcarrier spacing, the muted sets of RBs not carrying any data. In one embodiment, the muted sets of RBs are configured to send phase tracking reference signals ("PTRS"), the PTRS used for common phase error ("CPE")/inter-carrier interference ("ICI") estimation and for cancelling the CPE/ICI on data subcarriers that are transmitted with the default SCS.

In one embodiment, the resource element mapping configuration for subcarriers of muted REs of the sets of RBs comprises at least one muted RE that coincides with a transmit DC subcarrier location when the location of the transmit DC subcarrier is within a resource grid for the UE device. In further embodiments, the second method includes sending assistance information to the UE device, the assistance information comprising information about a location of punctured bits that correspond to muted REs of the sets of RBs such that the punctured bits of the muted REs are ignored during decoding.

In one embodiment, the second method includes sending, to the UE device, rate-matching parameters that consider the irregular mapping of the REs, the parameters comprising an indication of a number and a location of empty subcarriers for a rate-matching calculation.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving a resource element mapping configuration comprising an indication of an irregular subcarrier spacing for a plurality of subcarriers, wherein the resource element mapping configuration is based on a carrier frequency, and wherein the resource element mapping configuration defines different sets of resource blocks ("RBs") with different subcarrier offsets; and
   applying the indicated irregular subcarrier spacing to resource elements ("REs") according to the resource element mapping configuration.

2. The method of claim 1, wherein the indication of the irregular subcarrier spacing comprises a parameter that indicates a frequency offset between the plurality of subcarriers.

3. The method of claim 2, wherein the offset between two subcarriers of the plurality of subcarriers that are closer to a baseband direct current ("DC") is a higher frequency offset than the frequency offset between two different subcarriers that are further away from the baseband DC.

4. The method of claim 3, wherein the frequency offset is determined based on at least one of a frequency range, a bandwidth, a default subcarrier spacing, a modulation and coding scheme, regulatory requirements, and whether a baseband DC subcarrier location is offset by 7.5 kHz relative to a center of the indicated subcarrier or not.

5. The method of claim 2, wherein each RE is centered on a subcarrier and the plurality of REs are centered in a frequency domain about a default subcarrier spacing, the irregular subcarrier spacing comprising a frequency offset achieves a subcarrier spacing between REs that is offset from the default subcarrier spacing.

6. The method of claim 1, wherein the indication of the irregular subcarrier spacing comprises a parameter that indicates a frequency offset between the subcarriers of each set of RBs such that, for each set of RBs, the offset between two subcarriers that are closer to a baseband direct current ("DC") is a higher frequency offset than the frequency offset between two different subcarriers that are further away from the baseband DC.

7. The method of claim 6, wherein sets of RBs that are within a threshold frequency of the baseband DC are muted while different sets of RBs that are without the threshold frequency use a default subcarrier spacing ("SCS"), the muted sets of RBs not carrying any data.

8. The method of claim 7, wherein the muted sets of RBs are configured to send phase tracking reference signals ("PTRS"), the PTRS used for common phase error ("CPE")/inter-carrier interference ("ICI") estimation and for cancelling CPE/ICI on data subcarriers that are transmitted with the default SCS.

9. The method of claim 7, wherein the resource element mapping configuration for subcarriers of muted REs of the sets of RBs comprises at least one muted RE that coincides with a transmit DC subcarrier location when the location of the transmit DC subcarrier is within a resource grid.

10. The method of claim 7, further comprising receiving assistance information, the assistance information comprising information about a location of punctured bits that correspond to muted REs of the sets of RBs such that the punctured bits of the muted REs are ignored during decoding.

11. The method of claim 1, further comprising receiving rate-matching parameters that consider the irregular subcarrier spacing of the REs, the parameters comprising an indication of a number and a location of empty subcarriers for a rate-matching calculation.

12. The method of claim 11, further comprising, in response to not receiving rate-matching parameters and in response to no empty REs being used, performing normal reception and decoding of a transport block ("TB").

13. A User Equipment ("UE"), comprising:
   at least one memory; and
   at least one processor coupled with the at least one memory and configured to cause the UE to:
      receives a resource element mapping configuration comprising an indication of an irregular subcarrier spacing for a plurality of subcarriers, wherein the resource element mapping configuration is based on a carrier frequency, and wherein the resource element mapping configuration defines different sets of resource blocks ("RBs") with different subcarrier offsets; and
      apply the indicated irregular subcarrier spacing to resource elements ("REs") according to the resource element mapping configuration.

14. The UE of claim 13, wherein the indication of the irregular subcarrier spacing comprises a parameter that indicates a frequency offset between the plurality of subcarriers.

15. The UE of claim 14, wherein the offset between two subcarriers of the plurality of subcarriers that are closer to a baseband direct current ("DC") is a higher frequency offset than the frequency offset between two different subcarriers that are further away from the baseband DC.

16. The UE of claim 13, wherein the indication of the irregular subcarrier spacing comprises a parameter that indicates a frequency offset between the subcarriers of each set of RBs such that, for each set of RBs, the offset between two subcarriers that are closer to a baseband direct current ("DC") is a higher frequency offset than the frequency offset between two different subcarriers that are further away from the baseband DC.

17. The UE of claim 16, wherein sets of RBs that are within a threshold frequency of the DC are muted while different sets of RBs that are without the threshold frequency use a default subcarrier spacing, the muted sets of RBs not carrying any data.

18. The UE of claim 13, wherein the at least one processor is configured to cause the UE to receives rate-matching parameters that consider the irregular subcarrier spacing of the REs, the parameters comprising an indication of a number and a location of empty subcarriers for a rate-matching calculation.

19. A network equipment (NE), comprising:
at least one memory; and
at least one processor coupled with the at least one memory and configured to cause the NE to:
determine a resource element mapping configuration comprising an irregular subcarrier spacing for a plurality of subcarriers, wherein the resource element mapping configuration is based on a carrier frequency, and wherein the resource element mapping configuration defines different sets of resource blocks ("RBs") with different subcarrier offsets; and
transmit the resource element mapping configuration.

20. A method performed by a network equipment (NE), the method comprising:
determining a resource element mapping configuration comprising an irregular subcarrier spacing for a plurality of subcarriers, wherein the resource element mapping configuration is based on a carrier frequency, and wherein the resource element mapping configuration defines different sets of resource blocks ("RBs") with different subcarrier offsets; and
transmitting the resource element mapping configuration.

* * * * *